United States Patent
Ryan, Jr.

(10) Patent No.: US 6,173,274 B1
(45) Date of Patent: Jan. 9, 2001

(54) PRODUCTION MAIL SYSTEM HAVING SUBSIDIES FOR PRINTING OF THIRD PARTY MESSAGES ON MAILPIECES

(75) Inventor: Frederick W. Ryan, Jr., Oxford, CT (US)

(73) Assignee: Pitney Bowes Inc., Stamford, CT (US)

( * ) Notice: Under 35 U.S.C. 154(b), the term of this patent shall be extended for 0 days.

(21) Appl. No.: 09/223,643

(22) Filed: Dec. 30, 1998

(51) Int. Cl.$^7$ .............. G06F 17/00; G07B 17/02
(52) U.S. Cl. .............. 705/408; 235/375; 705/401; 705/410
(58) Field of Search .............. 235/375; 705/401, 705/408, 410

(56) References Cited

U.S. PATENT DOCUMENTS

| | | | |
|---|---|---|---|
| 4,571,925 | * 2/1986 | Adams | 53/502 |
| 4,639,873 | 1/1997 | Baggarly et al. | 364/466 |
| 4,725,718 | 2/1988 | Sansone et al. | 235/495 |
| 4,734,865 | 5/1988 | Scullion et al. | 364/478 |
| 4,760,532 | * 7/1988 | Sansone et al. | 364/464 |
| 4,797,830 | 1/1989 | Baggarly et al. | 364/464.03 |
| 4,831,554 | 5/1989 | Storace et al. | 364/519 |
| 4,873,645 | 10/1989 | Hunter et al. | 364/479 |
| 4,959,795 | 9/1990 | Christensen et al. | 364/464.03 |
| 5,008,520 | 4/1991 | Georgiou et al. | 235/462 |
| 5,008,827 | 4/1991 | Sansone et al. | 364/464.02 |
| 5,024,153 | 6/1991 | Bannister et al. | 101/91 |
| 5,043,908 | 8/1991 | Manduley et al. | 364/478 |
| 5,058,030 | 10/1991 | Schumacher | 364/478 |
| 5,072,400 | 12/1991 | Manduley et al. | 364/478 |
| 5,157,243 | 10/1992 | Ramsey et al. | 235/376 |
| 5,168,804 | 12/1992 | Lee et al. | 101/99 |
| 5,177,687 | 1/1993 | Baggarly et al. | 364/464.03 |
| 5,220,770 | * 6/1993 | Szewczyk et al. | 53/493 |
| 5,384,886 | * 1/1995 | Rourke | 395/147 |
| 5,390,251 | * 2/1995 | Pastor et al. | 380/21 |
| 5,454,038 | 9/1995 | Cordery et al. | 380/23 |
| 5,471,925 | * 12/1995 | Heinrich et al. | 101/91 |
| 5,490,077 | 2/1996 | Freytag | 364/464.02 |
| 5,509,109 | 4/1996 | Kim et al. | 395/114 |
| 5,579,449 | 11/1996 | Strobel | 395/110 |
| 5,602,743 | * 2/1997 | Freytag | 364/416.18 |
| 5,659,481 | * 8/1997 | Qutub et al. | 364/478.08 |
| 5,724,245 | * 3/1998 | Maher et al. | 364/464.18 |
| 5,734,566 | 3/1998 | Stengl | 364/138 |
| 5,768,959 | 6/1998 | Lorenzo | 83/74 |
| 5,787,406 | * 7/1998 | Arsenault et al. | 705/410 |
| 5,801,944 | * 9/1998 | Kara | 364/464.2 |
| 5,819,241 | 10/1998 | Reiter | 705/408 |
| 5,822,739 | 10/1998 | Kara | 705/410 |
| 5,948,061 | 9/1999 | Merriman et al. | 709/219 |
| 6,026,385 | * 2/2000 | Harvey et al. | 705/408 |
| 6,029,137 | * 2/2000 | Cordery et al. | 705/1 |

* cited by examiner

*Primary Examiner*—Donald Hajec
*Assistant Examiner*—Jamara A. Franklin
(74) *Attorney, Agent, or Firm*—Angelo N. Chaclas; Michael E. Melton

(57) ABSTRACT

A production mail system for producing a mailpiece including an inserter system for feeding a document in a path of travel and into an envelope. The document includes a control code printed thereon. The inserter includes a scanner located adjacent the path of travel for reading the control code on the document and a printer for printing a selected message on the envelope corresponding to the control code.

10 Claims, 6 Drawing Sheets

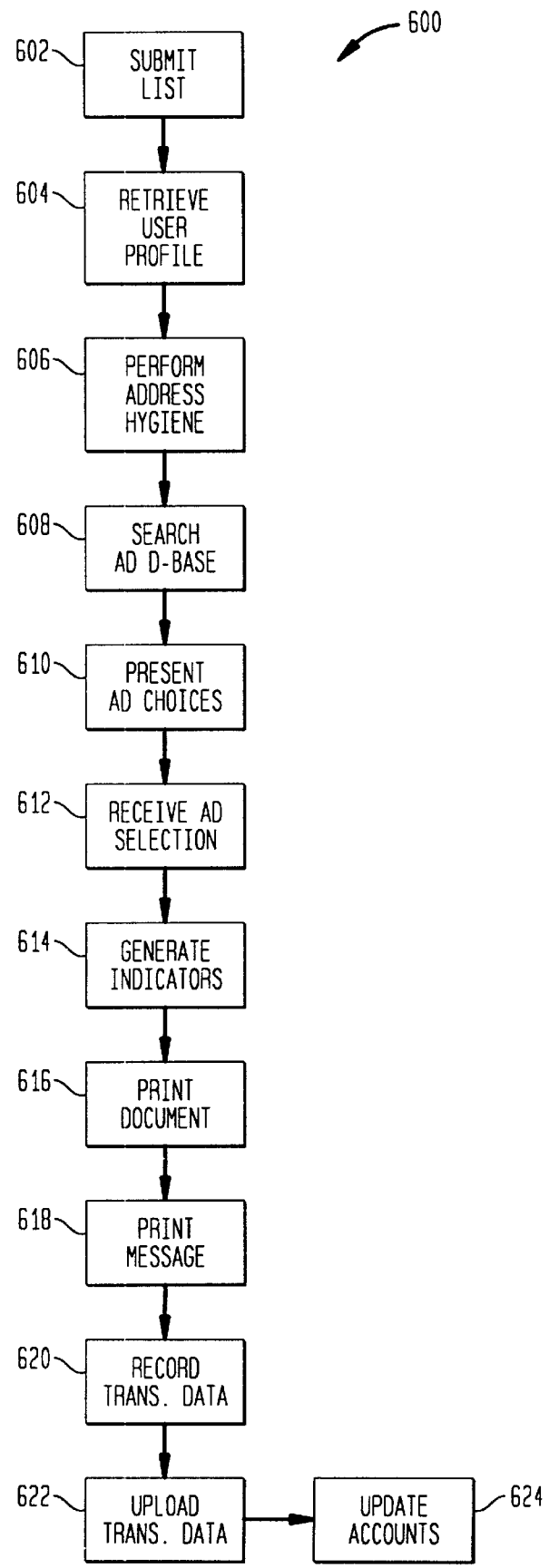

PRODUCTION MAIL SYSTEM HAVING SUBSIDIES FOR PRINTING OF THIRD PARTY MESSAGES ON MAILPIECES

CROSS REFERENCE TO RELATED APPLICATIONS

This application is related to the following co-pending applications filed concurrently herewith and commonly assigned to the assignee of this application: U.S. patent application Ser. No. 09/224,256, entitled POSTAGE PRINTING SYSTEM HAVING SUBSIDIZED PRINTING OF THIRD PARTY MESSAGES, U.S. patent application Ser. No. 09/224,238, entitled POSTAGE PRINTING SYSTEM HAVING A DIGITAL COUPON DISTRIBUTION SYSTEM and U.S. patent application Ser. No. 09/223,504, entitled POSTAGE PRINTING SYSTEM HAVING VARIABLE SUBSIDIES FOR PRINTING OF THIRD PARTY MESSAGES ON MAILPIECES, all of which are specifically incorporated herein by reference.

FIELD OF THE INVENTION

This invention relates generally to production mail systems. More particularly, this invention is directed to a production mail system including subsidies for printing of third party messages.

BACKGROUND OF THE INVENTION

Production mail systems, such as the Mail Center 2000™ mailpiece production system are well known. Generally, these systems are used by organizations (financial institutions, utility companies, insurance companies, etc.) that produce a large volume of mailings. The typical production mail system includes a data processing system, a printer system and an inserter system. The data processing system produces a plurality of documents intended for respective recipients. The printer system generates hard copies or printouts of the documents. The inserter system assembles the documents, folds the documents, stuffs the documents into envelopes to create a mailpiece and otherwise prepares the mailpieces for deposit with the postal authority for delivery.

Inserter systems capable of generating over 10,000 mailpieces per hour are well known in the art. Often times, the inputs to the inserter system are computer generated and the printed documents contains information that is intended for a particular addressee. Depending upon the type of printer system being employed, the documents may originate from a stack of cut sheets or from a web of forms. It is the function of the inserter system to accept the documents and produce the individual mailpieces that correspond to each document. To accomplish this, the typical inserter includes a variety of modules for performing different tasks on the documents passing through the inserter, such as: various web handling modules (slitters, cutters and bursters) for separating the continuous forms into singular or discrete documents, a sheet feeder module for feeding individual cut sheets, an accumulator module for assembling the sheets and/or form documents into a collation, a folder module for folding the collation into a desired configuration (Z-fold, C-fold, half fold), a conveyor/staging module for transporting and queuing the collation, a plurality of enclosure feeder modules for assembling and adding a packet of enclosures to the collation, an insert station module for inserting the collation into an envelope, and a control system to synchronize the operation of the overall inserter system to assure that the collations are properly assembled. Examples of such inserter systems are the 8 Series™ and 9 Series™ inserter systems available from Pitney Bowes, Inc. of Stamford, Conn.

Typically, information for control of such inserter systems is read from a control document by a scanner associated with the most upstream module in the inserter system. The control document is generally an address bearing document and contains information that is specific to a particular addressee. Additionally, each control document contains control information for instructing the downstream modules as to how to assemble a particular mailpiece. Once scanned, the control information is transmitted to the control system of the inserter system which monitors the processing of the collation through each module. Generally, the control document includes a barcode type control code, or other machine readable symbology, that defines: the number of forms or sheets to be accumulated into the collation, the number of enclosures from each of the enclosure feeder modules to be assembled to the collation and information for other purposes such as the selection of appropriate postage. A more detailed description of inserter systems including bar code scanning may be found in U.S. Pat. No. 5,008,520 and U.S. Pat. No. 5,157,243.

It is also known to print selected messages (sometimes referred to as ad slogans, although such messages are not necessarily restricted to advertisements) on mailpieces along with a postal indicia using a postage meter incorporated into the inserter system. Generally, the message bears no relation to the postal indicia. Alternatively, a printer separate from the postage meter may be employed for printing the messages on the mailpieces.

U.S. Pat. No. 4,831,554 teaches a postage meter that allows the postage meter manufacturer to broker the use of advertising space by third parties on the mailpieces. In concept, a third party advertiser may wish to take advantage of the space on the outgoing mailpieces from a particular postage meter user to advertise its own products and/or services or communicate some other type of message. In this system, a message the content of which originates from a third party is stored electronically within the postage meter. The postage meter keeps a count of the number of times that the message is printed in conjunction with the postal indicia. This count is then used by the data center to provide a subsidy to the postage meter user during a subsequent billing cycle and is correspondingly also used by the data center to invoice the third party advertiser.

Although this brokering system represents a new business opportunity for postage meter manufacturers, it suffers from certain drawbacks and disadvantages. First, the third party advertiser cannot exercise any control over when the message is dispensed. Thus, if the message is time sensitive, then the relevance of the message may be lost after a certain date and the third party advertiser would be compelled to pay for advertising that was not effective. For example, advertisements directed to promotions that have expiration dates (rebate programs, concert tickets, limited time offers, political election/other voting inducements, etc.) are useless once the relevant time period has passed. Second, the third party advertiser cannot exercise any control over the number of messages dispensed. Thus, if the third party advertiser allocated a fixed advertising budget and accordingly only wanted to pay for a limited number of mailpieces containing the message, then the third party advertiser may be compelled to pay for advertising that was not wanted if the postage meter user generates increased mail volume over that which was anticipated. Third, the third party advertiser cannot exercise any control over who receives the message. Thus, the third party advertiser has no assurance that a target audience would be reached. As one example, advertisements (e.g. sports related or hair loss, as examples) intended primarily for males may not be relevant if the recipient of the mailpiece from the postage meter user was a female. Fourth, the third party advertiser cannot exercise any control over the geographic reach of the message. Here again, the third party advertiser has no assurance that the target audience would be reached. For example, advertisements (e.g. local car dealership or cleaning service, as examples) intended for a certain limited geographic region would not be relevant if the recipient of the mailpiece from the postage meter user was located many miles away from the certain limited geographic region. As a related example, advertisements intended for the certain limited geographic region on mailpieces originating from outside of the certain limited geographic region would not benefit from the increased good will of being associated with a sender located in the certain limited geographic region.

Although this brokering system represents a new opportunity for users to subsidize the costs associated with preparing and sending mailpieces, it suffers from certain drawbacks and disadvantages. First, the user may not want the recipient gaining the impression that the user endorses the third party message. Thus, the user may not want to be associated with certain types of third party messages. For instance, political messages, messages from competitor's and the like may not be appropriate for the user's mailpiece. Second, dilution of any user message is likely to occur if third party messages appear. Thus, the effectiveness of the user message is reduced. Third, some recipients may experience a loss of intimacy with the user due to the appearance of third party messages. This may negatively impact the good will of the user. Fourth, the user may experience extended transaction times for securing and printing postage. This leads to increased operating costs which partially offsets the benefits associated with any corresponding subsidies.

As described above, the effectiveness of the third party messages printed on mailpieces is low. Because of the above drawbacks and disadvantages, the fees that third party advertisers are willing to pay postage meter manufacturers are relatively low. In turn, the subsidies that the postage meter manufacturer are able to pass along to the postage meter user are correspondingly relatively low. Thus, in the absence of a meaningful economic incentive there is little motivation for third party advertisers and postage meter users to participate in the above described system for placing third party advertising on mailpieces.

Therefore, there is a need for an improved system that allows the production mailer to take advantage of allowing advertising by third parties on its mailpieces. More particularly, there is a need for a production mail system that places the messages on mailpieces in a more effective manner so that third party advertisers are more likely to reach their target audiences. In this manner, the third party advertisers would be willing to pay higher fees resulting in an increased economic incentive for third party advertisers and postage meter users to participate.

SUMMARY OF THE INVENTION

The present invention provides a system and methods for improving the effectiveness of third party advertising on mailpieces. Generally, this is accomplished by facilitating the selection and application of third party messages for printing on envelopes. Optionally, various restriction data, based upon user preferences, third party advertiser preferences, recipient parameters, non-addressee parameters or some combination of the above, may be employed during the message selection process.

In accordance with the present invention, there is provided a production mail system for producing a mailpiece including an inserter system for feeding a document in a path of travel and into an envelope. The document includes a control code printed thereon. The inserter includes a scanner located adjacent the path of travel for reading the control code on the document and a printer for printing a selected message on the envelope corresponding to the control code.

In accordance with one variation of the present invention, the production mail system includes a data processing system having a third party advertiser database, a recipient address and a control system in operative communication with the third party advertiser database. The third party advertiser database has a plurality of ad data profiles where each of the ad data profiles includes message data and restriction data. The message data is representative of a message, respectively, for printing on the envelope. The control system uses the restriction data from the plurality of ad data profiles in combination with the recipient address to identify a subset of messages available for printing, receives an indication of the selected message from the subset of messages authorized for printing on the envelope; and incorporates within the control code an indication of the selected message.

In accordance with the present invention, a method of operating a production mail system and a method of manufacturing a production mail system are also provided.

Therefore, it is now apparent that the present invention substantially overcomes the disadvantages associated with the prior art. Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 6 is a flow chart showing the operation of the production mail system in accordance with the present invention.

DETAILED DESCRIPTION OF THE PREFERRED EMBODIMENTS

Figure 1:
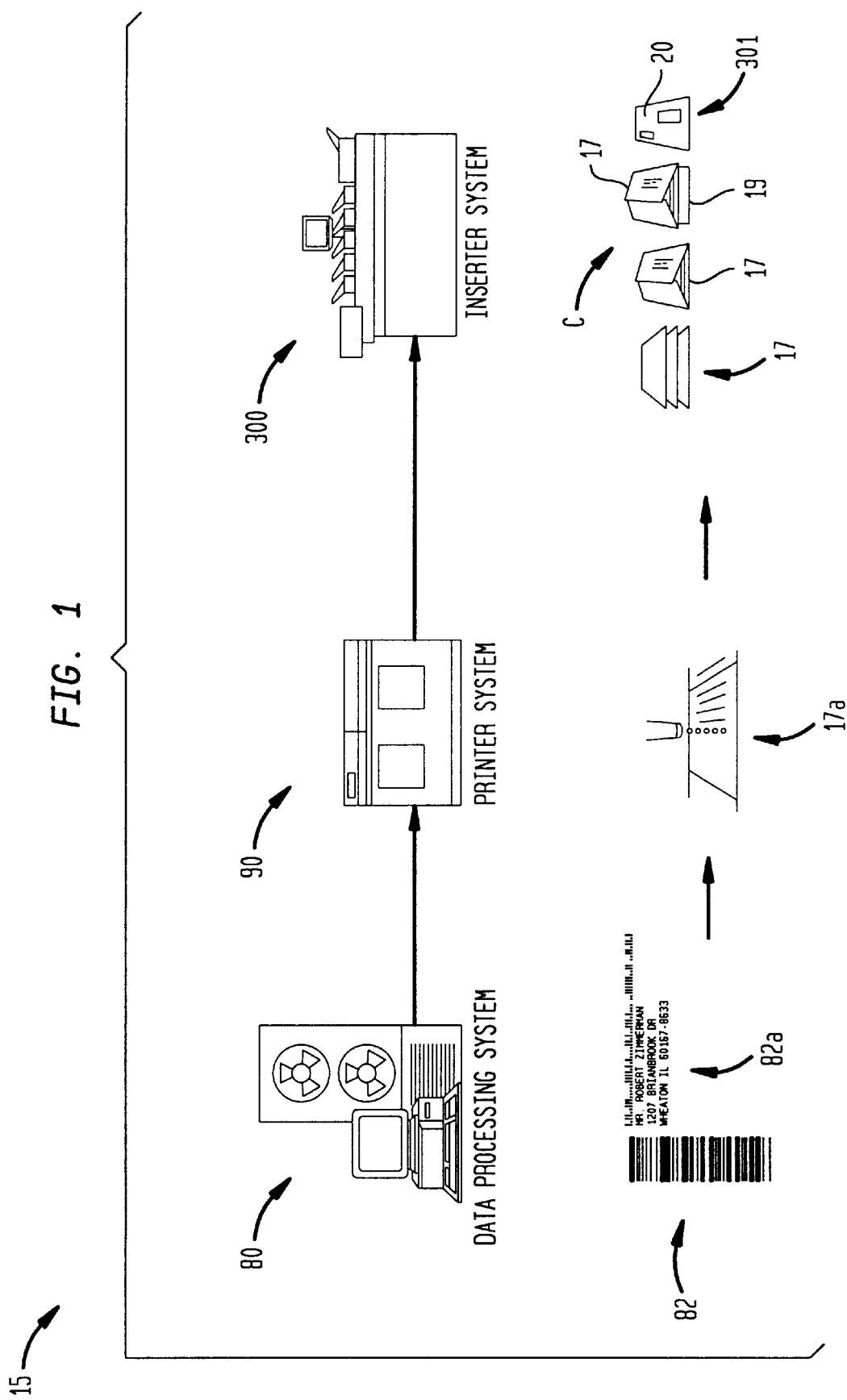
FIG. 1 is a simplified representation of a production mail system including a data processing system, a printer system and an inserter system in which the present invention may be incorporated.

Referring to FIG. 1, an example of a production mail system 15 in which the present invention may be incorporated is shown. Those skilled in the art will appreciate that the exact configuration of the production mail system 15 is particular to the needs of the user and that many variations are available. Thus, the description that follows is directed to one example of a production mail system 15. Furthermore, the description that follows will be limited to that which is necessary for an understanding of the present invention. The production mail system 15 includes a data processing system 80, a printer system 90 and an inserter system 300. Generally, the data processing system 80 produces a plurality of documents intended for respective recipients. The printer system 90 generates hard copies or printouts of the documents. The inserter system 300 assembles the documents, folds the documents, stuffs the folded documents into respective envelopes to create a mailpiece and otherwise prepares the mailpieces for deposit with a postal authority for delivery.

The data processing system 80 is typically operated under the control of a user that produces high volume mailpieces for billing purposes (utility companies, credit card companies, insurance companies, etc.) or for statement purposes (banks, other financial companies, etc.). Generally, the user's host application software program collects and organizes various information relating to individual accounts that customers maintain with the user. This information is utilized to produce customized documents corresponding to each customer's individual account.

Additionally, the data processing system 80 generates a control code 82 for each document, respectively. The control code 82 contains control information relating to each particular addressee 82a and provides instructions for downstream modules of the production mail system 15 as to how to assemble each particular document 17 to create a mailpiece 301.

Typically, the control code 82 is printed on a first or address bearing page of each document 17 by the printer system 90 which receives print instructions from the data processing system 80. The printer system 90 may employ any readily available printing technology, such as: electrophotography, ink jet, impact, thermal transfer and the like, to print the pages 17a of the document 17. The print medium fed into the printer system 90 may be a continuous web of paper or cut paper sheets. Additionally, the print medium may contain pre-printed information of a generic character, such as: user return address information, column headings, information box headings and the like. Thus, the utilization of pre-printed information increases the overall efficiency of the production mail system 15 by allowing the data processing system 80 not to have to generate print instructions for this generic information and requiring the printer system 90 only to print information unique to each addressee.

The output of the printer system 90 is directed to the inserter system 300. This may be accomplished by directly coupling the output of the printer system 90 to the inserter system 300 or by taking a completed batch of printed documents and loading them into the inserter system 300. Typically, information for control of the inserter system 300 is read from the control code by a scanner (not shown) associated with an upstream module in the inserter system 300, such as those disclosed in U.S. Pat. No. 5,008,520 and U.S. Pat. No. 5,157,243, the disclosures of which are specifically incorporated herein by reference. Once scanned, the control information is transmitted to a supervisory controller (not shown) of the inserter system 300 which monitors and controls the processing of the documents 17 through each module of the inserter system 300.

Figure 2:
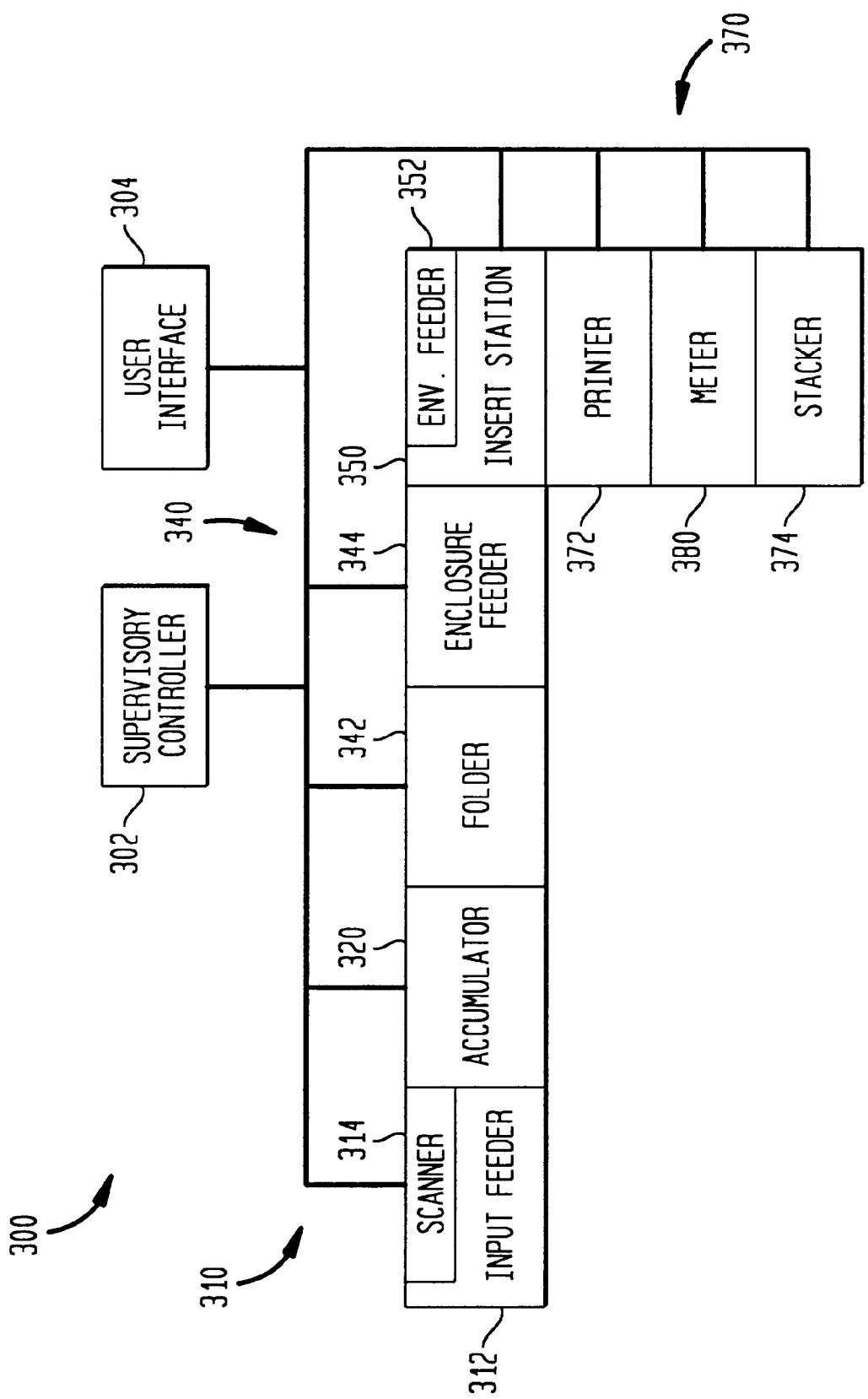
FIG. 2 is a more detailed representation of the inserter system in accordance with the present invention.

Referring to FIG. 2, a more detailed representation of the various modules (sub-systems) of the inserter system 300 is shown. Referring to FIG. 1 in view of FIG. 2, the inserter system 300 includes a supervisory controller 302, a user interface 304, an input section 310, a chassis section 340 and an output section 370. The supervisory controller 302 monitors and controls the processing of the documents 17 through each module of the inserter system 300. The user interface 304 communicates messages to and receives instructions from an operator of the inserter system 300. The input section 310 receives the printed output from the data processing system 80 while the chassis section 340 prepares the mailpieces 301 and the output section 370 performs finishing operations on the mailpieces 301.

The input section 310 includes a input feeder module 312, and an accumulator module 320. The input feeder module 312 may be comprised of a burster/slitter module (not shown), cut sheet feeder module (not shown) or other such devices (not shown) depending on the type of print medium output by the data processing system 80. The input feeder module 312 singulates the pages 17a and feeds them one at a time to the accumulator module 320. Additionally, the input feeder 312 includes a scanner 314 mounted in proximity to a paper path of the pages 17a so as to read any control code 82 printed thereon. Using the control information contained within the control code 82, the supervisory controller 302 instructs the accumulator module 320 how many successive pages 17a are contained within each document 17. In conventional fashion, the accumulator module 320 assembles together successive pages 17a all pertaining to a particular document 17, respectively.

The chassis section 340 accepts the document 17 including all its pages 17a from the accumulator module 320 and performs further operations on the document 17. The chassis section 340 includes a folder module 342, an enclosure feeder module 344 and an insert station module 350. The folder module 342 folds the document 17 into a desired configuration (Z-fold, C-fold, half fold, etc.) and feeds the document 17 to the enclosure feeder module 344 which assembles any desired enclosures 19 to the document 17 to form a collation C. The insert station 350 includes an envelope feeder 352 and inserts the collation C into an envelope 20 to form the mailpiece 301.

The output section 370 receives the mailpiece 301 and performs finishing operation on the mailpiece 301 so that it is ready for deposit with a carrier, such as the postal authority, for delivery to the addressee. The output section 370 includes a printer module 372, a postage meter module 380 and a stacker module 374. The printer module 372 prints the delivery point zip+4 in bar code format on the envelope 20. Alternatively, the delivery point bar code may be printed by the printer system 90 in conjunction with the recipient address. The postage meter module 380 prints a postal indicia (not shown) on the envelope 20 and the stacker module 374 stacks the mailpieces 301 neatly for retrieval by the operator.

Figure 3:
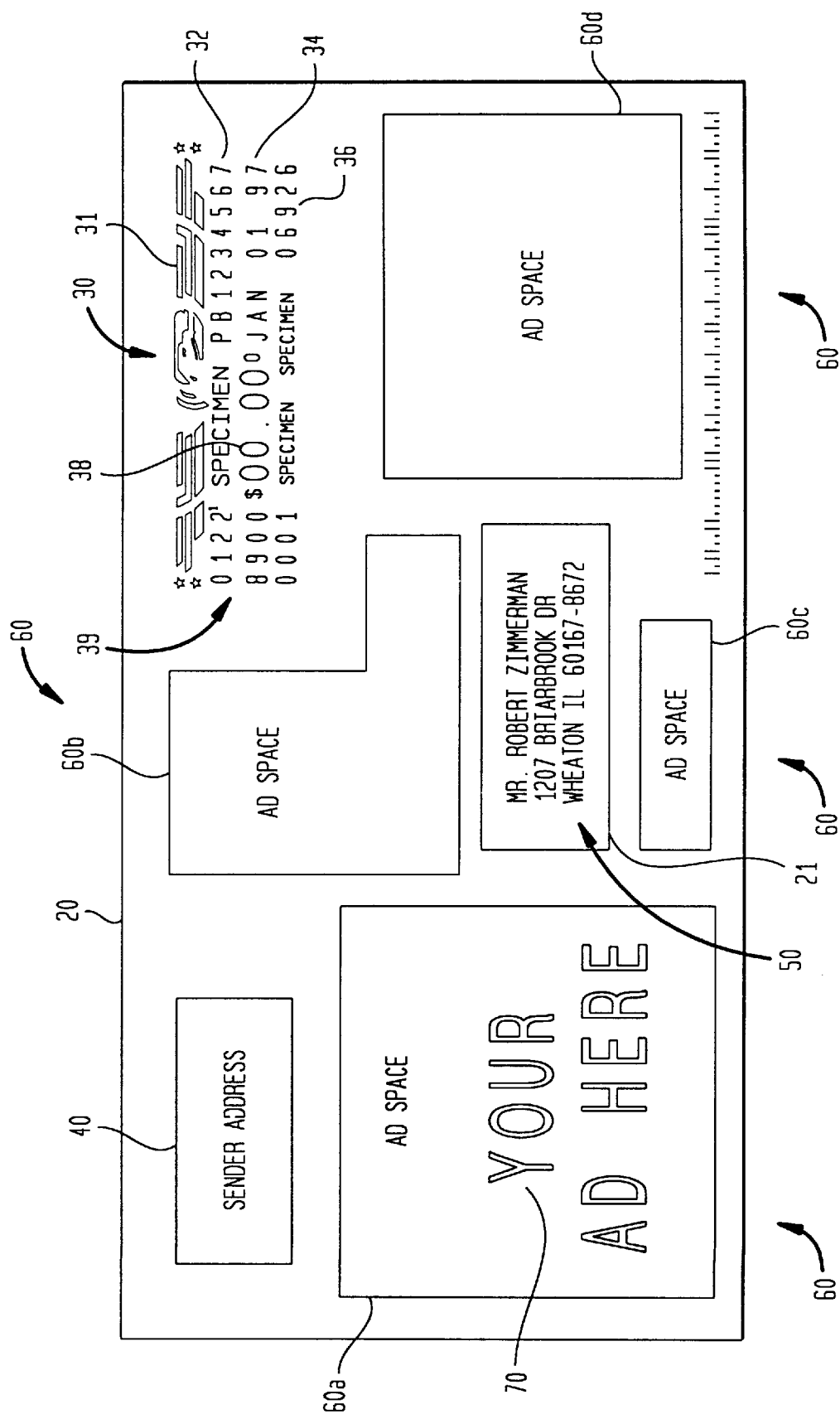
FIG. 3 is a front view of an envelope that has been processed by the production mail system in accordance with the present invention.

Referring to FIG. 3 in view of FIGS. 1 and 2, the envelope 20 having an example of a postal indicia 30 printed by the postage meter 372, a sender address 40 and a recipient address 50 visible through a window 21 is shown. The postal indicia 30 includes both fixed data that does not change from postal indicia to postal indicia and variable data that may change from postal indicia 30 to postal indicia 30. Generally, the fixed data includes a graphic design 31 (an eagle with stars), a meter serial number 32 uniquely identifying the postage meter (not shown) that dispensed the postage and a licensing or 30 receiving post office identifier (zip code) 36. Generally, the variable data includes a date 34 indicating when the postage was dispensed, a postal value 38 indicating an amount of postage and other data 39 for use by the postal authority in verifying the authenticity of the postal indicia 30 using conventional techniques. However, those skilled in the art will recognize that the exact content of both the fixed data and variable data is subject to regulation by the postal authority and a matter of design choice. For example, in a virtual postage meter environment the meter serial number 32 may not be used and the receiving post office identifier (zip code) 36 may be variable data. Moreover, any format (numeric, alpha-numeric, bar code, other symbology and the like) may be employed for the verification data 39 or the other portions of the postal indicia 30.

The further details of the envelope 20 will now be described. In conventional fashion, the user may optionally place a sender or return address 40 in the upper left hand corner of the envelope 20. As examples, the sender address 40 may be preprinted on the envelope 20, printed on an adhesive label and affixed to the envelope 20, printed concurrently with the delivery point bar code printed by the printer module 372 or printed concurrently with the postal indicia 30 by the printer 387. The recipient address 50 corresponds to the addressee 82a and represents the delivery point for the envelope 20. Typically, the recipient address 50 is printed by the printer system 90. In conventional fashion, the document 17 is accumulated so that the page bearing the recipient address 50 is on top and then folded and inserted into the envelope 20 so that the recipient address 50 appears through the window 21 of the envelope 20. The remainder of the envelope 20 that is not occupied by the postal indicia 30, the sender address 40 and the window 21 is available as advertising space 60 made up of a plurality of ad zones 60a, 60b, 60c and 60d. The advertising space 60 may contain one or more messages from third party advertisers.

Figure 4:
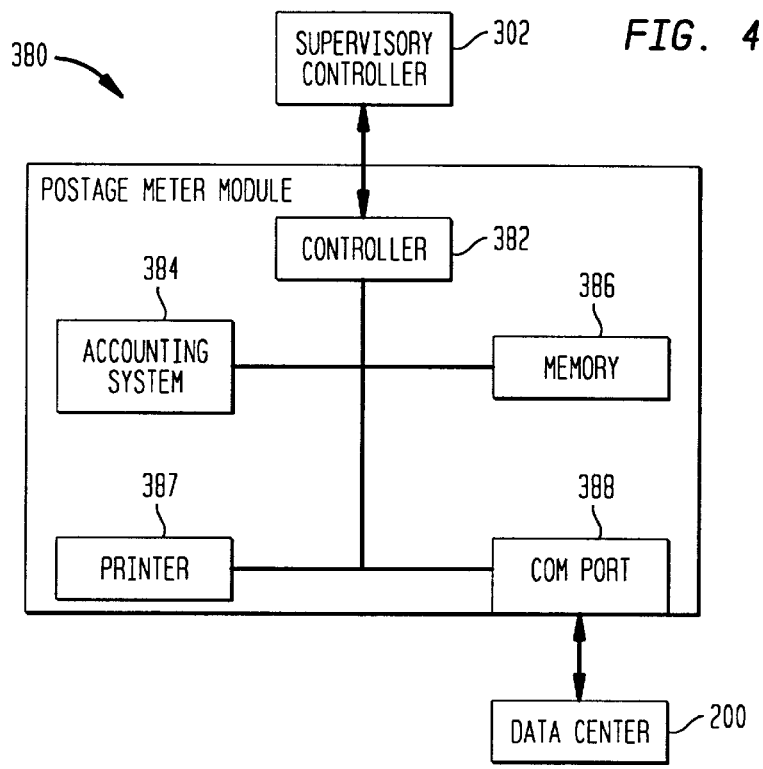
FIG. 4 is a simplified representation of a postage meter module in accordance with the present invention.

Referring to FIG. 4 in view of FIGS. 1–3, a more detailed schematic of the postage meter module 380 is shown. The postage meter module 380 includes a controller 382, an accounting system 384, a memory 386, a printer 387 and a communication port 388 all in operative communication with each other over suitable communication pathways. Similarly, the controller 382 is in operative communication with the supervisory controller 302 over suitable communication pathways. Also, the controller 382 may be selectively placed in operative communication with a data center 200 via the communication port 388 using any suitable communication pathway, such as: LAN, WAN, telephone line, internet and the like. The controller 382 oversees and coordinates operation of the postage meter module 380 and may be of any combination of software, firmware and hardware. The accounting system 384 maintains various register data associated with the postage meter module 380 as is well known in the art. The memory 386 includes graphic files associated with the messages from the third party advertisers. The printer 387 may employ any conventional print technology to print the postal indicia 30 and any messages using the graphic files stored in memory 386. Preferably, the printer 387 is a dot matrix type printer (laser, ink jet, thermal transfer, etc.) so as to facilitate the printing of a wide variety of different messages merely by updating the graphic files in the memory 386.

The postage meter module 380 described above is intended to be illustrative of one example of a postage metering system for use with the present invention. Those skilled in the art will recognize that the functional portions of the postage meter module 380 may be organized in a variety of different ways as is known in the field of postage metering.

Figure 5A:
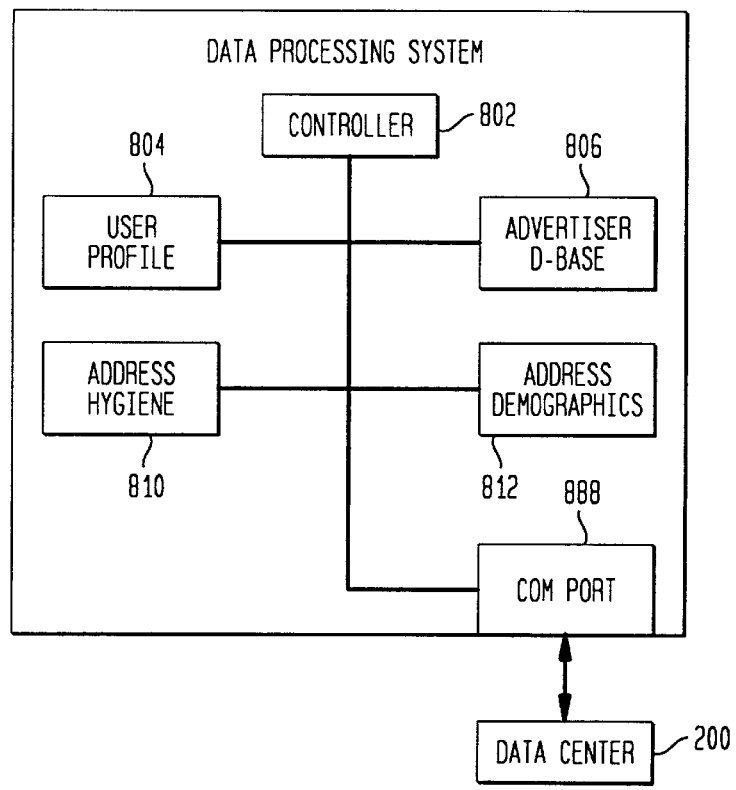
FIG. 5A is a simplified representation of a data processing system in accordance with the present invention.

Referring to FIG. 5A in view of FIGS. 1–3, a more detailed schematic of the data processing system 80 is shown. The data processing system 80 may be based on any conventional computer based platform (PC, server, workstation, mainframe or the like) and includes a controller 802, a user profile 804, an advertiser database 806, an address hygiene database 810, an address demographics database 812 and a communication port 888, all of which are in operative communication with each other using conventional means. Also, the controller 802 may be selectively placed in operative communication with the data center 200 via the communication port 888 using any suitable communication pathway, such as: LAN, WAN, telephone line, internet and the like. The user profile 804 contains information concerning the user's account, such as: user name, user address, preferred payment vehicle or arrangements (periodic invoice, direct credit card authorization, electronic funds transfer, etc.), and the like, that have been established with a postage meter manufacturer. Similarly, the advertiser database 806 contains information concerning individual advertiser accounts, such as: advertiser name, advertiser address, preferred payment vehicle or arrangements (periodic invoice, direct credit card authorization, electronic funds transfer, etc.), ad data and the like, that have been established with the postage meter manufacturer. The address hygiene database 810 may employ any suitable database for use in cleansing submitted addresses to ensure that they are complete and correct, such as the Address Matching System (AMS) available from the United States Postal Service, Cross Check™ software system available from Pitney Bowes Inc. of Stamford, Conn. or any other commercially available system for cleansing addresses. The address demographics database 812 may employ any suitable database containing statistics relevant to certain geographic locations. As examples, various databases exist that contain detailed demographic information by zip code, such as: PRIZM available from Claritas Inc. (see Internet URL www.claritas.com), United States census information or any other database that is generally known and commercially available. Generally, the advertiser database 806, the address hygiene database 810 and the address demographics database 812 may be updated from time to time by any conventional means or by direct communications with the data center 200 via the communication port 888.

Figure 5B:
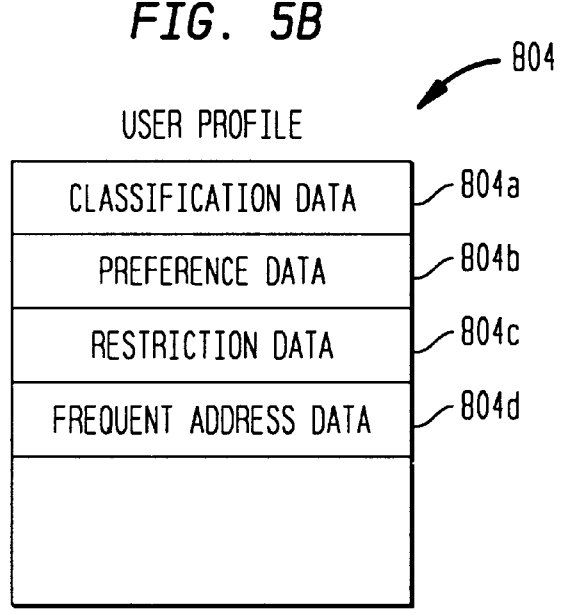
FIG. 5B is a schematic representation of a user data file associated with a user of the postage printing system in accordance with the present invention.

Referring to FIG. 5B in view of FIGS. 1, 3 and 5A, a schematic representation of the user profile 804 associated with a particular user is shown. Generally, a respective user data profile 804 is established for each of the individual user accounts and allows each user to set parameters for controlling third party advertising on their respective envelopes 20. This may be accomplished at the time when the user opens up an account with the data center 200 or at any other mutually convenient occasion. The user data profile 804 includes classification data 804a, preference data 804b, restriction data 804c and frequent address data 804d. The classification data 804a includes an indicator of whether the user is a commercial user, a residential user, or a dual mode user. Furthermore, for the commercial user, the classification data 804a may optionally include an additional indicator of the type of business that the user is involved in. Preferably, a Standard Industry Code (SIC) representative of the user's business is assigned to each commercial user, respectively, as part of the classification data 804a. As examples, automobile rental companies would be assigned a SIC in the range of 2100 to 2199, while automobile dealerships would be assigned a SIC in the range of 2400–2499 and service stations would be assigned a SIC in the range of 4000 to 4099. The preference data 804b includes an indicator of whether the user allows third party advertising at all. In this manner, the user may by-pass the third party advertising system in its entirety. Optionally, the preference data 804b may include an indication of preferred third party advertisers. Thus, only messages from these preferred third party advertisers would be potentially available for printing on the envelope 20. As yet another option, the preference data 804b may include various default settings, such as: automatic selection of a preferred third party advertiser or automatic selection of the third party advertiser and corresponding message paying the highest subsidy. The restriction data 804c may include addressee restriction data and non-addressee (quantitative) restriction data. In this manner, the user may indicate in advance those particular recipient addresses 50 where third party advertising is not allowed. The user non-addressee restriction data, described in greater detail below, may include: date restriction data; multi-ad restriction data; and ad space restriction data. The frequent address data 804d may include a listing of recipient addresses 50 that are used on a continual basis. In this manner, the user may select from the frequently used recipient addresses 50 instead of submitting address information. Preferably, address hygiene has already been performed on the frequently used recipient addresses 50. Those skilled in the art will recognize that the above described classification data 804a, preference data 804b, restriction data 804c and frequent address data 804d may be utilized independently from each other or in any desired combination.

Figure 5C:
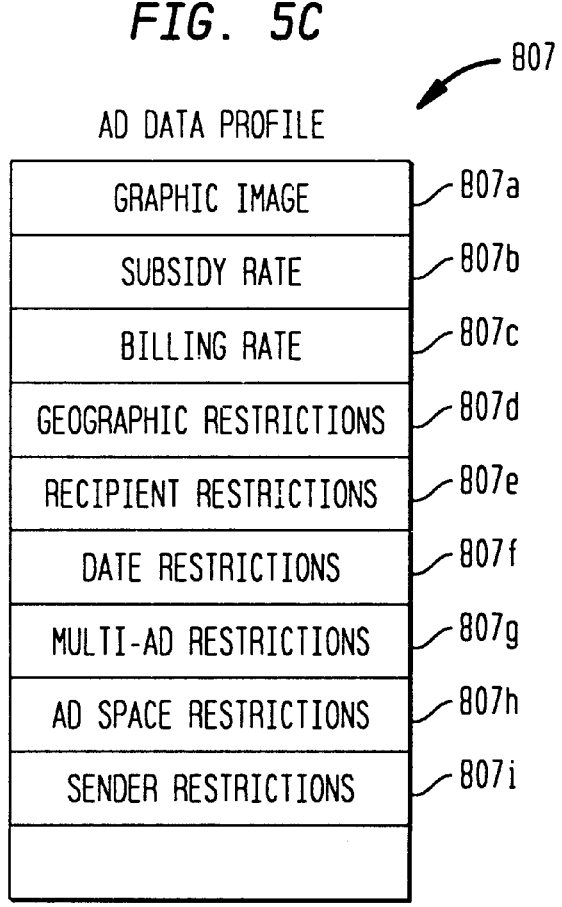
FIG. 5C is a schematic representation of an ad data file associated with a third party message to be printed on the envelope by the postage printing system in accordance with the present invention.

Referring to FIG. 5C in view of FIGS. 1, 3 and 5A, a schematic representation of an ad data profile 807 stored in advertiser database 806 and associated with a particular message from a third party advertiser is shown. The ad data includes: graphic image data 807a; subsidy rate data 807b; billing rate data 807c and restriction data. The restriction data may include sender restriction data 807i, addressee (recipient) restriction data and non-addressee (quantitative) restriction data, or any combination of types of restriction data. Preferably, the sender restriction data 807i includes an indication of whether or not the message may be used with a commercial user, a residential user or both. Additionally, the sender restriction data may include another indication of which SIC range or ranges the message is available to. Preferably, the addressee restriction data includes: geographic quantitative data 807d and recipient restriction data 807e. Preferably, the non-addressee restriction data includes: date restriction data 807f; multi-ad restriction data 807g; ad space restriction data 807h and sender restriction data 807i. Those skilled in the art will recognize that the message's date restriction data 807f, multi-ad restriction data 807g and ad space restriction data 807g are directly analogous to the user's non-addressee restriction data of date restriction data, multi-ad restriction data and ad space restriction data, respectively, from the description provided below. Piece count restriction data and budget limit data defining a maximum amount of advertising charges for a given time period may also be included in the non-address restriction data. The graphic image data 807a is representative of the desired message and may be stored in any manner of well known formats, such as: PDF, JPEG, GIF and the like. The subsidy rate data 807b includes information corresponding to the credit value that will be applied to the user's account for authorizing printing of the third party message on the envelope 20. The third party advertiser may proscribe different subsidy rates depending upon the Standard Industry Code or SIC range that the user falls with. Likewise, there may be a different subsidy rate depending upon whether or not the user is a commercial or residential user. The billing rate data 807c includes information corresponding to the debit value that will be applied to the third party advertiser's account in conjunction with printing of the third party message on the envelope 20. The geographic restriction data 807d provides an indication of what geographic areas the third party advertiser wants to target. This may be manifested by a restriction on the originating location or the destination location or preferably both. The recipient restriction data 807e provides an indication of the target audience. For example, distinctions may be made between a commercial and a residential address. In the preferred embodiment, the commercial versus residential distinction may be obtained from the Address Matching System. Alternatively, this may also be accomplished by interrogating the hygiened recipient address 50 for certain 'key words" indicative of a business entity, such as: inc., incorporated, co., company, associates, and the like or through the use of one of the other databases discussed above. As another example that may be used independent from or in combination with the example previously discussed, the address demographics database 812 allows further selection. Generally, income, age and other demographic statistics (age, income, education level, marital status, home ownership status, dependent information, ethnicity, etc.) are available for different regions of the country and for certain designated geographic regions. Thus, the delivery point zip code in the hygiened recipient address 50 may be cross referenced to the address demographics database 812 and the resulting other demographic statistics compared with the third party advertiser's requirements. For example, a luxury car manufacturer may only want its messages going to private residences from regions where the average income is above a predetermined threshold. The date restriction data 807f provides an indication of what dates the third party advertiser wants to advertise on. For example, expiration dates could be established beyond which the message will not be dispensed. As another example, periodic cycles ($1^{st}$ week of month, last week of month, on Mondays, 2 weeks before a holiday, etc.) could be established during which the message is available for printing. The multi-ad restriction data 807g provides an indication of whether or not the third party advertiser allows another third party advertiser to occupy ad space 60 on the envelope 20. The sentiment being that a multiplicity of messages will dilute the effectiveness of the individual messages versus if the individual messages were used singularly. If the third party advertiser allows other advertisers, then a reduced subsidy rate 807b and a reduced billing rate 807c may be applied when multiple messages are employed. The ad space restriction data 807h provides an indication of which ad zones 60a, 60b, 60c and 60d the third party advertiser authorizes for use with the message. Thus, the third party advertiser may exercise some control over where on the envelope 20 the message is printed. Similarly, as an option, the user may also provide an indication of which ad zones 60a, 60b, 60c and 60d the message may be printed in. For example, the user may be using an envelope 20 with preprinted images already occupying a portion of one or more ad zones 60a, 60b, 60c and 60d. In this scenario, the ad space restriction data 807h and any corresponding user ad space restriction data must be reconciled. Those skilled in the art will recognize that the above described restriction data 807d, 807e, 807f, 807g and 807h may be utilized independently from each other or in any desired combination. Still other restrictions may be utilized, such as piece count limits. It should now be apparent that the messages that meet the restriction criteria and are available for printing represent a subset of the total number of messages that are potentially available.

With the structure of the production mail system 15 described as above, the operational characteristics will now be described. Referring primarily to FIG. 6 while referencing the structure of FIGS. 1–4 and 5A, 5B and 5C, a flow chart of a routine 600 in accordance with the present invention is shown. The routine 600 may be comprised of any suitable combination of software, firmware and hardware subsystems executed by the production mail system 15. For the sake of clarity and brevity, it is assumed that the user maintains a valid account with the data center 200. It is also assumed that the user desires to include third party advertising on envelopes.

At 602, the transaction routine 600 commences when the user submits a mailing list (not shown) to the data processing system 80 for processing. The mailing list is comprised of a plurality of recipient addresses 50 corresponding to a plurality of mailpieces 301, respectively, that the user desires to send. Typically, the mailing list resides on the data processing system 80 and is generated by the user's host application software program. Alternatively, the mailing list may be imported to the data processing system 80. As an example, from a word processing document such as a letter. As yet another alternative, the data processing system 80 may use the frequent address data 804d and allow the user to select a desired recipient address from the frequently used recipient addresses list. Once the mailing list has been received, at 604, the data processing system 80 retrieves the user data profile file 804 associated with the user. As described above, the user data profile file 804 establishes parameters for controlling third party advertising on the each of the user's envelopes 20, respectively. For the sake of clarity and brevity, it is assumed that the user desires to include third party advertising on envelopes and has not established the preference data 804b to by-pass the third party advertising system. Next, at 606, the data processing system performs address hygiene each of the submitted addresses. Each of the recipient addresses 50 received from the user is compared against the address hygiene database 810. At this time, any misspelled words are corrected and any missing information (zip code, zip+4, street name, etc.) is filled in from the address hygiene database 810 to yield a hygiened or corrected recipient address 50. If the data processing system 80 cannot verify the integrity of the recipient address 50 received from the user, then the user may be instructed to check the recipient address 50 and resubmit it.

Next, at 608, the data processing system 80 searches the third party advertiser database 806 for those messages available for printing on the envelope 20. This involves taking into consideration the hygiened recipient address 50 and reconciling the preference data 804b and restriction data 804c of the user with ad data profiles 807 of the third party advertisers. For the reasons discussed above, not every third party advertiser may want to advertise on every envelope 20. The user data profile file 804 is utilized by the data processing system 80 prior to searching the third party advertiser database 806 for those messages available for printing on the envelope 20. Any short cuts that may be employed that would make the searching quicker and more efficient are identified. For example, if the recipient address 50 indicated by the user is one of the restricted recipient addressees identified by the user's addressee restriction data, then no searching at all occurs. As another example, if the user's preference data indicates a preferred third party advertiser listing, then the searching may be limited to only those messages from the preferred third party advertisers. During searching, the ad data profiles of the third party advertisers is applied to the user and the hygiened recipient address 50. Furthermore, the restriction data of the third party advertisers must be reconciled with the restriction data of the user. Thus, both sets of restriction data must be satisfied for a message to be available for printing. That is, the user and the hygiened recipient address 50 must meet the third party advertisers' ad data profile 807 and the third party advertiser must meet the user's data profile 804.

Next, at 610, once the available messages are determined, the relevant messages and their corresponding subsidy rate 807b are presented to the user on the data processing system 80. This provides the user with the opportunity to view and analyze the available messages along with their corresponding subsidy rate 807b. Next, at 612, the user selects a message for printing on the envelope 20. For the sake of clarity and brevity, it will be assumed that only one (1) message 70 is selected for printing in ad space zone 60a. However, those skilled in the art will recognize that, as described above, multiple messages may be printed. Alternatively, if the user indicates in the preference data 804b a default to the highest paying message, then this activity may be automated.

Next, at 614, the data processing system 80 generates an message indicator, a subsidy indicator based upon subsidy rate data 807b and a billing indicator based upon billing rate data 807c, all corresponding to the selected message 70 to be incorporated into the control code 82 associated with the particular document 17 intended for the hygiened recipient address 50. Next, at 616, the printer system 90 prints the particular document 17 including its respective control code 82 having the message indicator contained therein. Next, at 618, the inserter system 300 scans the control code 82 and uses the message indicator to print the selected message 70 on the envelope 20. Generally, the message 70 is printed by the postage meter module 380. The message indicator may identify a selected graphic file previously stored in memory 386 for use in printing the selected message 70. On the other hand, the message indicator may contain sufficient graphic data so that reference to an external file is not necessary. Next, at 620, the postage meter module 380 records the transaction data associated with printing the selected message 70. Generally, the transaction data includes an indicator of the third party advertiser associated with the selected message 70 and the corresponding subsidy and billing indicators.

Next, at 622, the transaction data is uploaded to the data center 200 at some convenient time, such as: the end of a batch run, the end of the day, or in conjunction with adding postage to the postage meter module 380 during a remote recharge. Next, at 624, the data center 200 uses the transaction data to update the user account to reflect the transaction data, such as: the date, the postage amount dispensed, the hygiened address 50, the selected message 70, the corresponding subsidy, any fees associated with providing the above described services and any other relevant data. Similarly, the data center 200 updates the selected third party advertiser's account to reflect the transaction data, such as: the date, the selected message 70, the corresponding billing (advertising) fee, any additional fees associated with providing the above described services and any other relevant data. At a later time, the data center 200 exercises the preferred payment vehicle for the user and the selected third party advertiser, respectively.

Although the above description has been provided with respect to the generation of a single mailpiece 301, those skilled in the art will recognize that various activities may occur in batches. For example, the entire mail list may be processed by the data processing system 80 before the corresponding documents are printed by the printer system 90. As another example, all the documents corresponding to the mail list may be printed by the printer system 90 before they are fed into the inserter system 300. Thus, those skilled in the art will recognize that there are many different ways to organize and configure the timing of those activities described above.

As an option, the overall efficiency of the production mail system 15 may be improved by adding an additional feature that takes advantage of presorting of the mail list. Generally, most large volume users pre-sort their mailpieces 301 before delivery to the postal authority so as to take advantage of postal discounts. In one variation, pre-sorting may occur following processing by the inserter system 300 by attaching a sorter system to the output end of the inserter system 300. In another variation, pre-sorting may occur at the data processing system 80 by taking the mail list and arranging the order of the recipient addresses 50 to best take advantage of postal discounts. Generally, this involves organizing the mail list so that recipient addresses 50 intended for the same geographic location are clustered together prior to printing the documents 17. In this variation, the message selection indication from Step 612 may be automatically re-used without any further input from the user for a subsequent recipient address 50 intended for the same geographic location as the first recipient address 50. Thus, the number of active user selections is reduced.

Based on the above description and the associated drawings, it should now be apparent that the present invention improves the ability of third party advertisers to more efficiently reach their target audience through advertising on envelopes. It should also be apparent that the present invention provides an efficient system of communicating third party message information to the inserter system 300 by embedding a message indicator in the control code 82. Alternatively, message indicator data could be passed to the inserter system 300 in electronic form instead of using control codes.

Many features of the preferred embodiment represent design choices selected to best exploit the inventive concept as implemented in a particular production mail system environment. However, those skilled in the art will recognize that various modifications can be made without departing from the spirit of the present invention. For example, the address hygiene database 810 and the third party advertiser database 806 may be resident at a remote computer system (not shown) or on the inserter system 300. Thus, a portion of the functionality of the data processing system 80 may be off loaded. Alternatively, the functionality of the data center 200 may be resident as part of the data processing system 80. Thus, those skilled in the art will recognize that there are many ways to distribute the functionality described above between various systems and modules of the production mail system 15.

Therefore, the inventive concept in its broader aspects is not limited to the specific details of the preferred embodiments described above, but is defined by the appended claims and their equivalents.

What is claimed is:

1. A production mail system for producing a mailpiece, comprising:
   an inserter system for feeding a document in a path of travel and into an envelope, the document including a control code printed thereon, the inserter including:
      a scanner located adjacent the path of travel for reading the control code on the document; and
      a printer for printing a selected message on the envelope corresponding to the control code; and
   a data processing system including:
      a third party advertiser database having a plurality of ad data profiles, each of the ad data profiles including message data and restriction data, each of the message data representative of a message, respectively, for printing on the envelope;
      a recipient address; and
      a control system in operative communication with the third party advertiser database, the control system for using the restriction data from the plurality of ad data profiles in combination with the recipient address to identify a subset of messages available for printing.

2. The production mail system of claim 1, wherein:
   the control system is further for:
      receiving an indication of the selected message from the subset of messages authorized for printing on the envelope; and
      incorporating within the control code an indication of the selected message.

3. The production mail system of claim 2, wherein:
   the inserter system further includes:
      a postage meter module including the printer and a memory having stored therein a plurality of message graphic data files; and
   wherein the postage meter module selects one of the plurality of message graphic data files corresponding to the selected message based upon the selected message indication incorporated within the control code.

4. The production mail system of claim 3, wherein:
   the postage meter module stores transaction data associated with printing the selected message on the envelope.

5. The production mail system of claim 4, wherein:
   the postage meter module uploads the transaction data to a data center; and
   the data center:
      applies a credit to an account corresponding to a user of the production mail system; and
      applies a debit to the advertiser account corresponding to the selected message.

6. A method of operating a production mail system to produce a mailpiece, the method comprising the step(s) of:
   generating a control code;
   feeding a document in a path of travel and into an envelope, the document including the control code printed thereon;
   providing a third party advertiser database having a plurality of ad data profiles, each of the ad data profiles including message data and restriction data, each of the message data representative of a message, respectively, for printing on the envelope;

providing a recipient address;

using the restriction data from the plurality of ad data profiles in combination with the recipient address to identify a subset of messages available for printing reading the control code on the document; and printing a selected message on the envelope corresponding to the control code.

7. The method of claim 6, further comprising the step(s) of:

receiving an indication of the selected message from the subset of messages authorized for printing on the envelope; and incorporating within the control code an indication of the selected message.

8. The method of claim 7, wherein:

the production mail system includes a postage meter module including the printer and a memory having stored therein a plurality of message graphic data files; and further comprising the step(s) of:

selecting for printing one of the plurality of message graphic data files corresponding to the selected message based upon the selected message indication incorporated within the control code.

9. The method of claim 8, further comprising the step(s) of:

storing transaction data associated with printing the selected message on the envelope.

10. The method of claim 9, further comprising the step(s) of:

uploading the transaction data to a data center for use in applying a credit to an account corresponding to a user of the production mail system and applying a debit to the advertiser account corresponding to the selected message.

\* \* \* \* \*